United States Patent [19]
Jensen et al.

[11] Patent Number: 5,591,082
[45] Date of Patent: Jan. 7, 1997

[54] SIDE-MOUNTED THROTTLE AND WEAPONS CONTROLLER FOR COMPUTER VIDEO GAMES AND FLIGHT SIMULATION

[75] Inventors: Christopher Jensen, Hillsboro, Oreg.; Robert L. Carter, Vancouver, Wash.

[73] Assignee: Thrustmaster, Inc., Hillsboro, Oreg.

[21] Appl. No.: 368,585

[22] Filed: Jan. 5, 1995

[51] Int. Cl.$^6$ .................................................. A63F 9/22
[52] U.S. Cl. ................... 463/38; 463/37; 463/36; 434/45; 364/410; 244/234; 74/471 XY
[58] Field of Search .................... 273/148 B, 438, 273/85 G, 434; 244/220, 221, 228, 230, 234; 345/158, 161, 156; 74/471 XY; 434/45; 341/20, 33; 364/410

[56] References Cited

U.S. PATENT DOCUMENTS

| | | | |
|---|---|---|---|
| D. 330,230 | 10/1992 | Carter . | |
| D. 334,415 | 3/1993 | Carter et al. . | |
| D. 351,625 | 10/1994 | Carter et al. . | |
| 4,717,098 | 1/1988 | Walker et al. | 244/234 |
| 4,820,162 | 4/1989 | Ross | 273/438 |
| 4,891,269 | 8/1989 | Meenen, Jr. | 434/45 |
| 5,209,661 | 5/1993 | Hildreth et al. | 273/148 B |
| 5,245,187 | 9/1993 | Noda | 242/261 |
| 5,273,235 | 12/1993 | Sato . | |
| 5,333,812 | 8/1994 | Sato | 242/261 |
| 5,398,028 | 3/1995 | Foon | 345/161 |
| 5,436,640 | 7/1995 | Reeves | 273/438 |

FOREIGN PATENT DOCUMENTS

| | | | |
|---|---|---|---|
| 3305075 | 12/1988 | Japan | 345/161 |

OTHER PUBLICATIONS

Brochure advertising QS202 Squadron Commander; QS205 Interceptor, *Quicknews*, Sep.–Oct. 1994, QuickShot Technology, Inc., Milpitas, California.
IBM Technical Disclosure Bulletin, vol. 32, No. 9B, Feb. 1990, "Three Dimensional Joystick via Cavity", pp. 180–181.

*Primary Examiner*—Jessica Harrison
*Assistant Examiner*—Mark A. Sager
*Attorney, Agent, or Firm*—Marger, Johnson, McCollom & Stolowitz, P.C.

[57] ABSTRACT

The throttle controller according to the invention includes a rectangular base having a shaft pivotally mounted thereon with a potentiometer having a stem connected to the shaft for sensing the position of the shaft. A cable is connected to the potentiometer for transmitting the sensed position to the video game. A handle is disposed along one side of the base and connected to a first end of the shaft for pivotally moving the shaft responsive to angular movement of the handle. The handle is comprised of two parts. A vertical handle member connected to the shaft and perpendicular thereto and a handle portion connected to the vertical handle member, which extends over the base and adapted to receive a user's hand. The shaft is mounted on the base by means of circular bearings that are received in a bearing mounts on the base. A braking mechanism is frictionally engaged with the shaft for adjusting the resistance of the handle to pivotal movement. The braking mechanism includes a braking arm pivotally mounted on the base, with an arcuate portion frictionally engaged from the shaft and a spring-loaded adjustment mechanism for adjustment of the friction force.

18 Claims, 6 Drawing Sheets

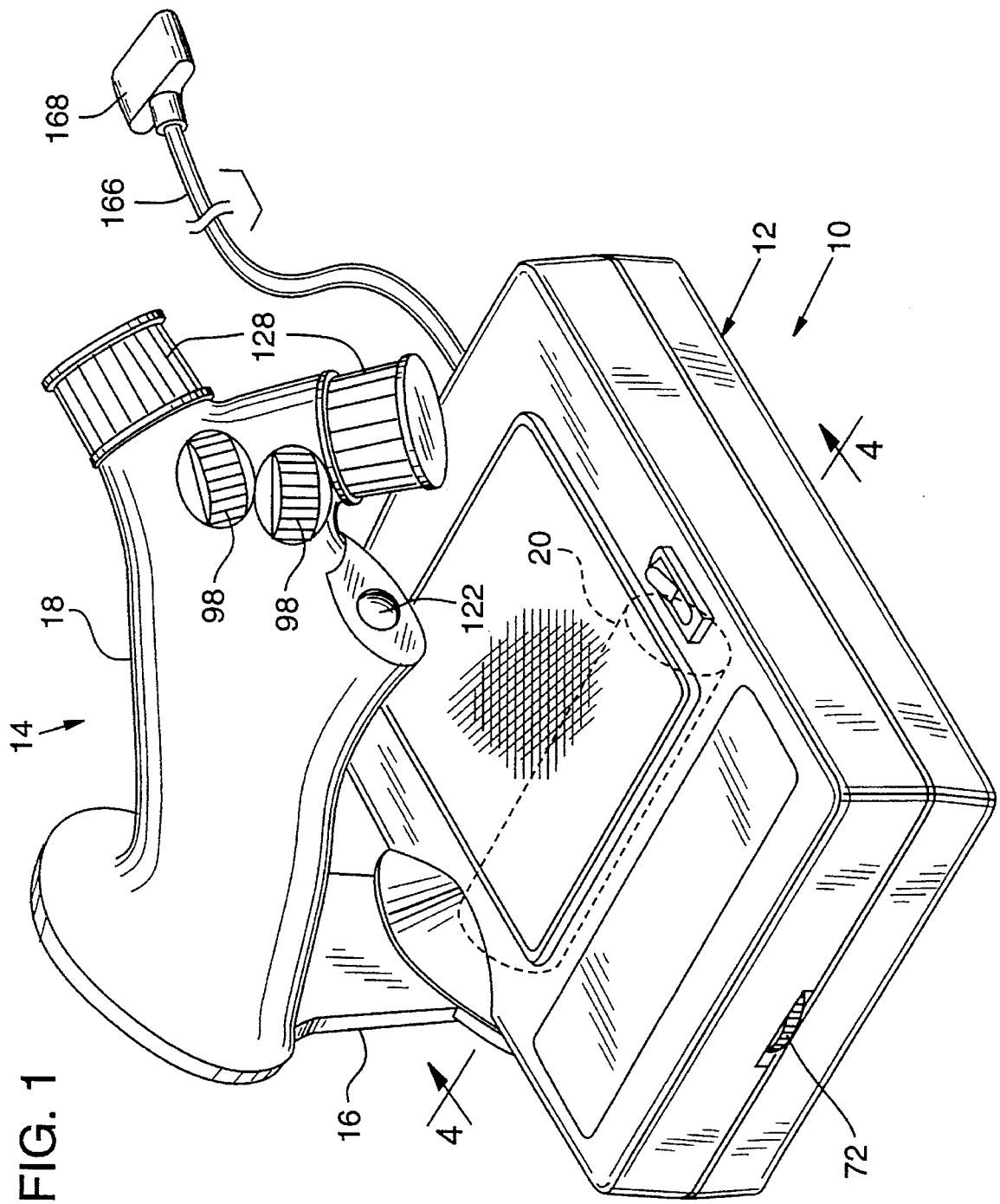

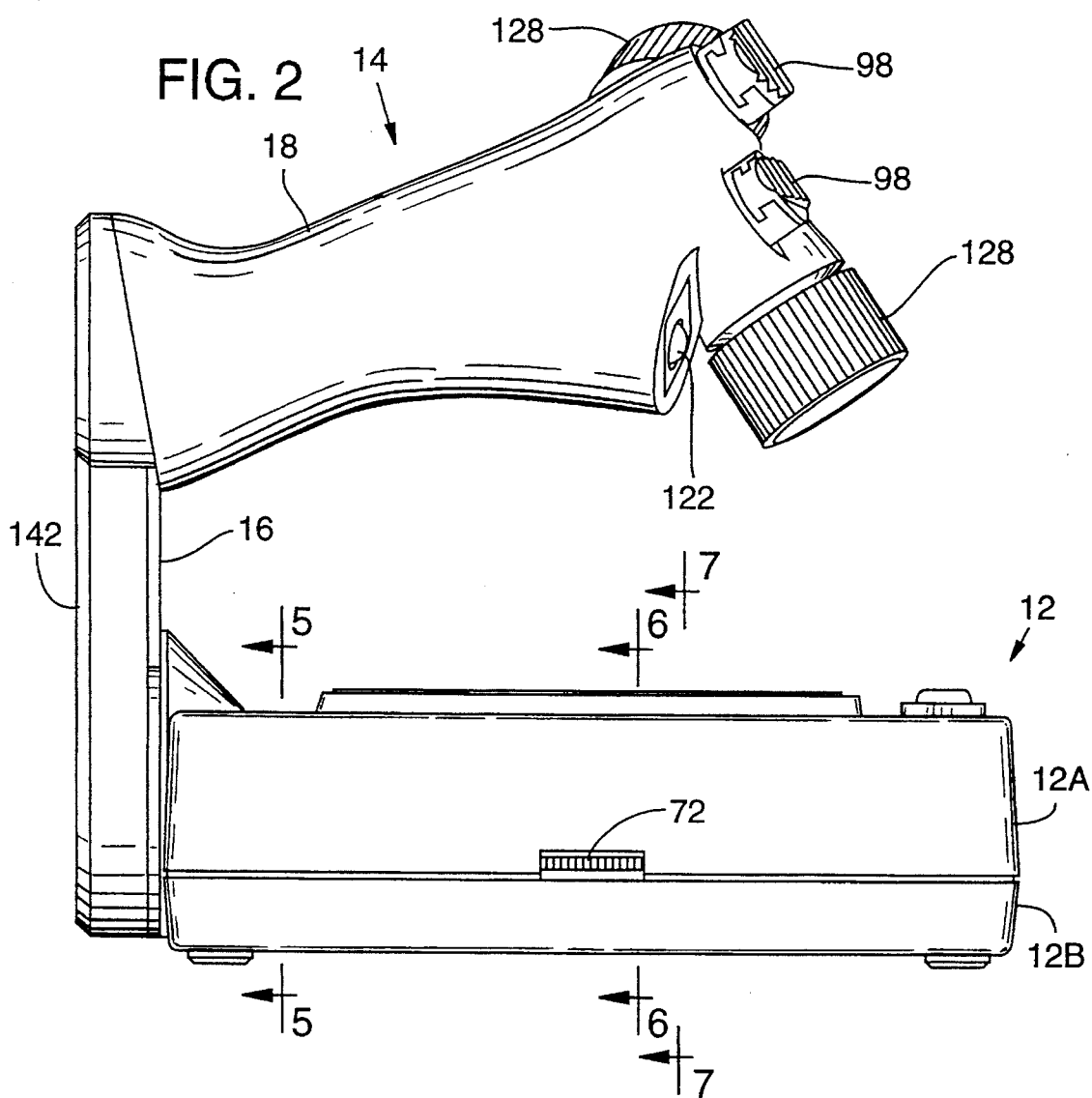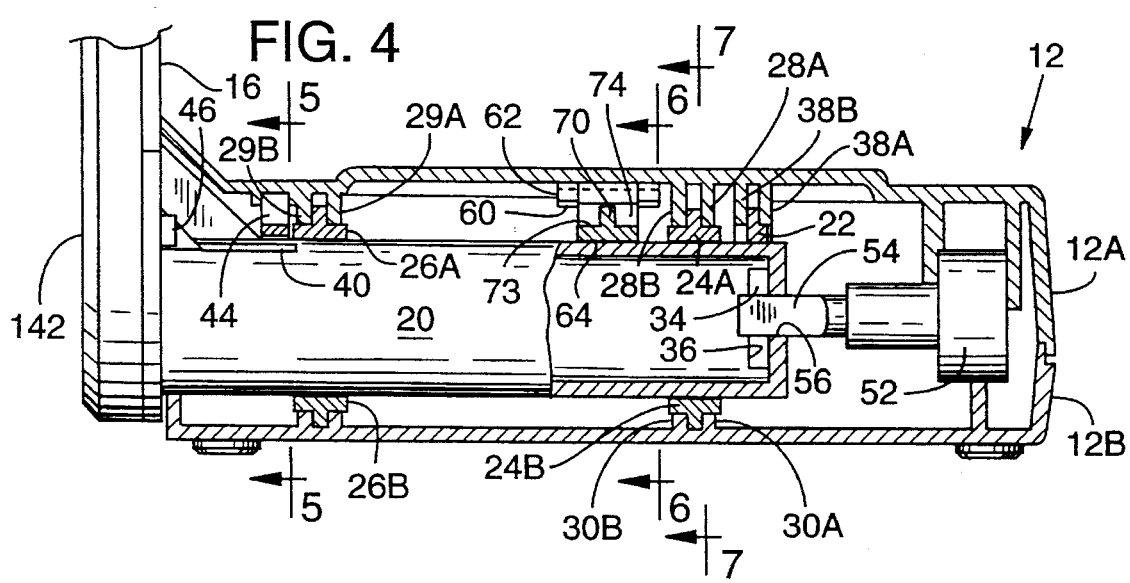

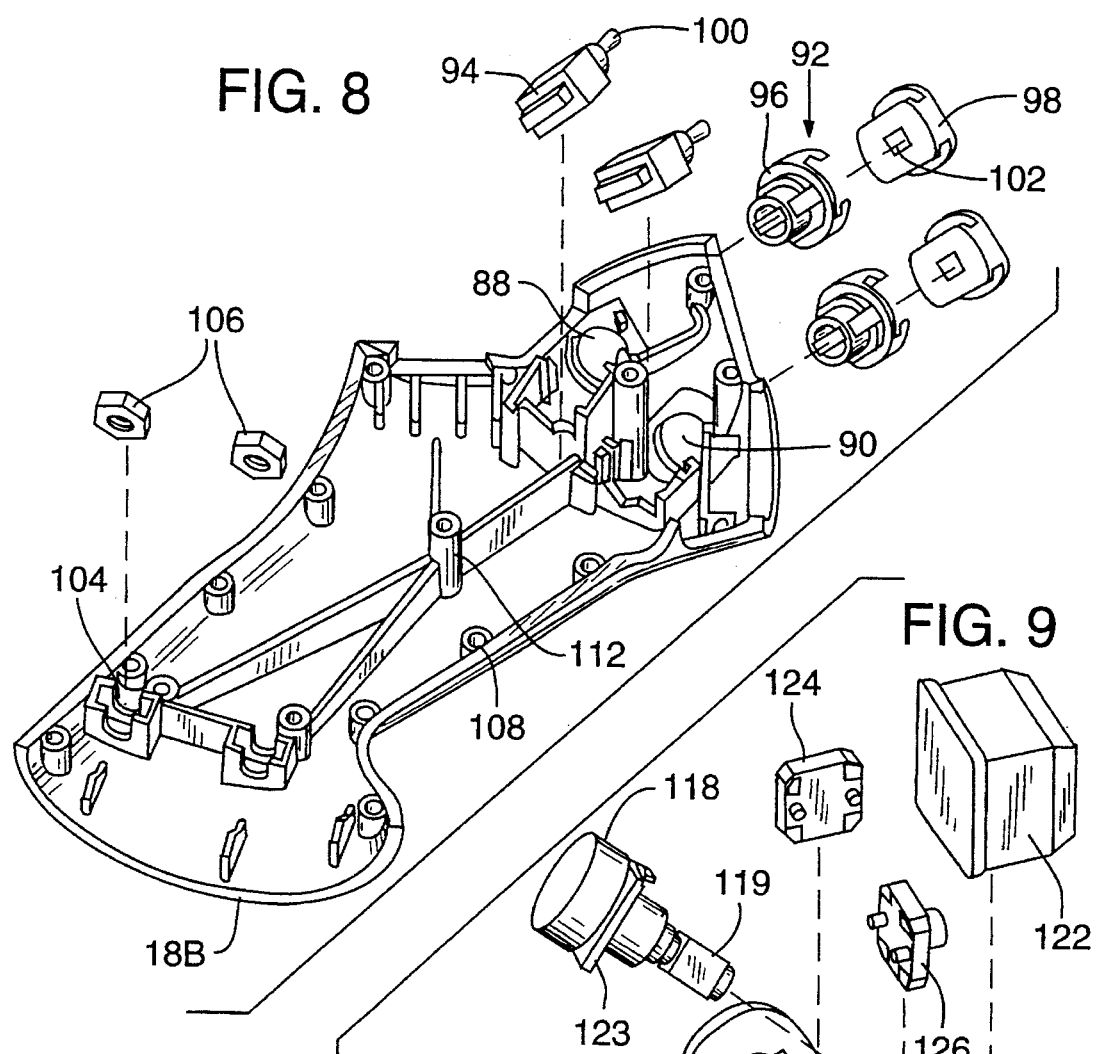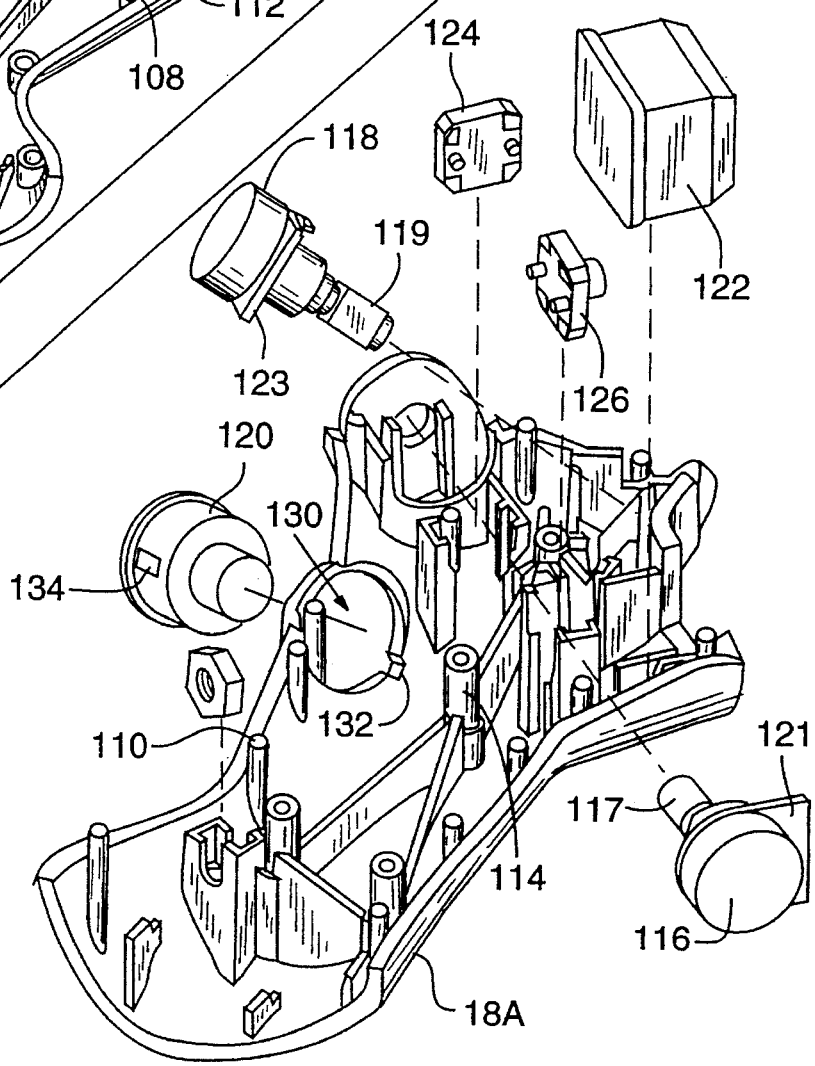

SIDE-MOUNTED THROTTLE AND WEAPONS CONTROLLER FOR COMPUTER VIDEO GAMES AND FLIGHT SIMULATION

BACKGROUND OF THE INVENTION

This invention relates generally to electronic video games and more particularly to game controllers therefor.

Video games are becoming increasingly popular. This popularity is due primarily to the increasing realism of video games. This realism, in turn, is due to two primary factors. The first is the availability of inexpensive, high-performance electronics. In the past, the computational demands of a realistic video game required expensive electronic hardware that placed such systems out of the reach of most consumers. Recent generations of microprocessors such as the ubiquitous Intel 80386 and 80486 microprocessors, however, have made practical, realistic video games.

Another factor that has lead to the increasing realism of video games is the availability of advanced game controllers. These advanced game controllers more closely resemble the look and feel of actual aircraft control devices. For example, the joystick manufactured by Thrustmaster of Tigard, Oreg. and sold under the trademark FCS™ simulates an actual F-16 fighter joystick. In addition, this product provides a multiplicity of discrete input devices such as are found on the actual F-16 joystick. Thus, when the Thrustmaster F-16 joystick is used in a flight simulator video game such as Falcon 3.0, the joystick provides accurate feel and control of the fighter plane. This provides for a more realistic simulation environment.

Comparable realism is not found in the other main game controller for flight simulators, i.e., the throttle control. There are other advanced throttle controllers on the market. For example, the throttle controller sold and manufactured by Thrustmaster under the trade name WCS provides a multiplicity of discrete and variable input devices to allow for individual control of a plurality of various functions. The look and feel of the WCS throttle controller, however, does not accurately reflect the actual throttle controller found in fighter planes like the F-16. The main difference between the WCS throttle controller and the actual throttle controller is that the throttle stick on the WCS is mounted in the middle of a base, whereas the actual F-16 throttle is mounted along a sidewall of the cockpit. As a result, the user of the WCS cannot easily rest his or her elbow in a stationary position while moving the throttle controller. Instead, the user must lift his or her elbow to move the throttle controller through its entire range of motion. This detracts from the realism of the video game.

There is an additional way in which the throttle controllers, including the WCS controller, differ from the actual fighter plane throttle controller. The actual throttle controller includes a clutch plate for adjusting the resistance of the throttle controller. The clutch plate includes a large wheel that can be rotated by hand to adjust the resistance encountered in moving the throttle handle. The clutch plate increases the friction the throttle arm encounters responsive to moving the throttle handle. This feature is not replicated on any throttle controllers for video games.

Accordingly, a need remains for a throttle controller for a video game that more accurately simulates the look and feel of an actual throttle stick.

SUMMARY OF THE INVENTION

It is, therefore, an object of the invention to provide a side-mounted throttle controller for a video game.

Another object of the invention is to provide a mechanism for adjusting the resistance in the throttle controller.

A further object of the invention is to provide additional input devices on the throttle controller.

The throttle controller according to the invention includes a preferably-rectangular base having a horizontal shaft pivotally mounted therein. A handle is disposed along one side of the base and connected to a first end of the shaft for pivotally moving the shaft responsive to angular movement of the handle. The handle is comprised of two parts. A radial handle member connected to the shaft and perpendicular thereto and a handle portion connected to the vertical radial member. The handle portion extends over the base parallel to the shaft and is adapted to be grasped by a user's hand. The shaft is journaled in the base by means of a circular beating or bushing that is received in a beating mount on the base. The shaft can rotate within the bearing. The side-mounted throttle controller also includes a potentiometer having a stem connected to the shaft for sensing the position of the handle. An electrical cable is connected to the potentiometer for transmitting an electrical signal corresponding to the sensed position to a computer for input to the video game.

The side-mounted throttle controller according to the invention preferably includes a braking mechanism for adjusting the resistance of the handle to pivotal movement. The braking mechanism includes a braking arm pivotally mounted on the base and having an arcuate portion frictionally engaged with the shaft. The braking mechanism also includes an adjustment mechanism that includes a knob for manually adjusting the braking mechanism. The knob includes a helical thread for applying pressure to a distal end of the braking arm responsive to rotation of the knob. The braking arm includes a compatible helical thread which tides along the helical thread of the knob as the knob is rotated. Rotation of the knob thereby causes the downward movement of the distal end of the braking arm thus increasing the pressure of the arcuate portion of the braking arm against the shaft. In this manner, the user can adjust the resistance of the throttle handle.

In another aspect of the invention, a switch mechanism is described which uses an inexpensive toggle switch to effectively implement a slide switch. The switch mechanism includes a toggle switch having a stem, a switch holder having an opening extending therethrough for receiving the stem, and a switch actuator slidably mounted on the switch holder and which also includes an opening for receiving the switch stem. The actuator is mounted in a channel formed on a top side of the switch holder. The switch holder includes shoulders or flanges for retaining the actuator in the channel. The switch holder also includes two legs for mounting the switch mechanism in an opening such as on the throttle control handle. The switch mechanism operates as a slide switch by toggling the toggle switch through its successive positions responsive to linear movement of the actuator along the switch holder channel. In this way, an inexpensive toggle switch can be used in lieu of an expensive slide switch.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a perspective view of the side-mounted throttle controller according to the invention shown in wire-frame lines to reveal internal structure.

FIG. 2 is a rear elevational view of the side-mounted throttle controller of FIG. 1.

FIG. 4 is a cross sectional view of the throttle controller taken along lines 4—4 in FIG. 1.

FIG. 8 is an exploded view of one half of the handle portion of the throttle controller of FIG. 1

FIG. 9 is an exploded view of a second half of the handle portion of the throttle controller of FIG. 1.

DETAILED DESCRIPTION

Figure 3:
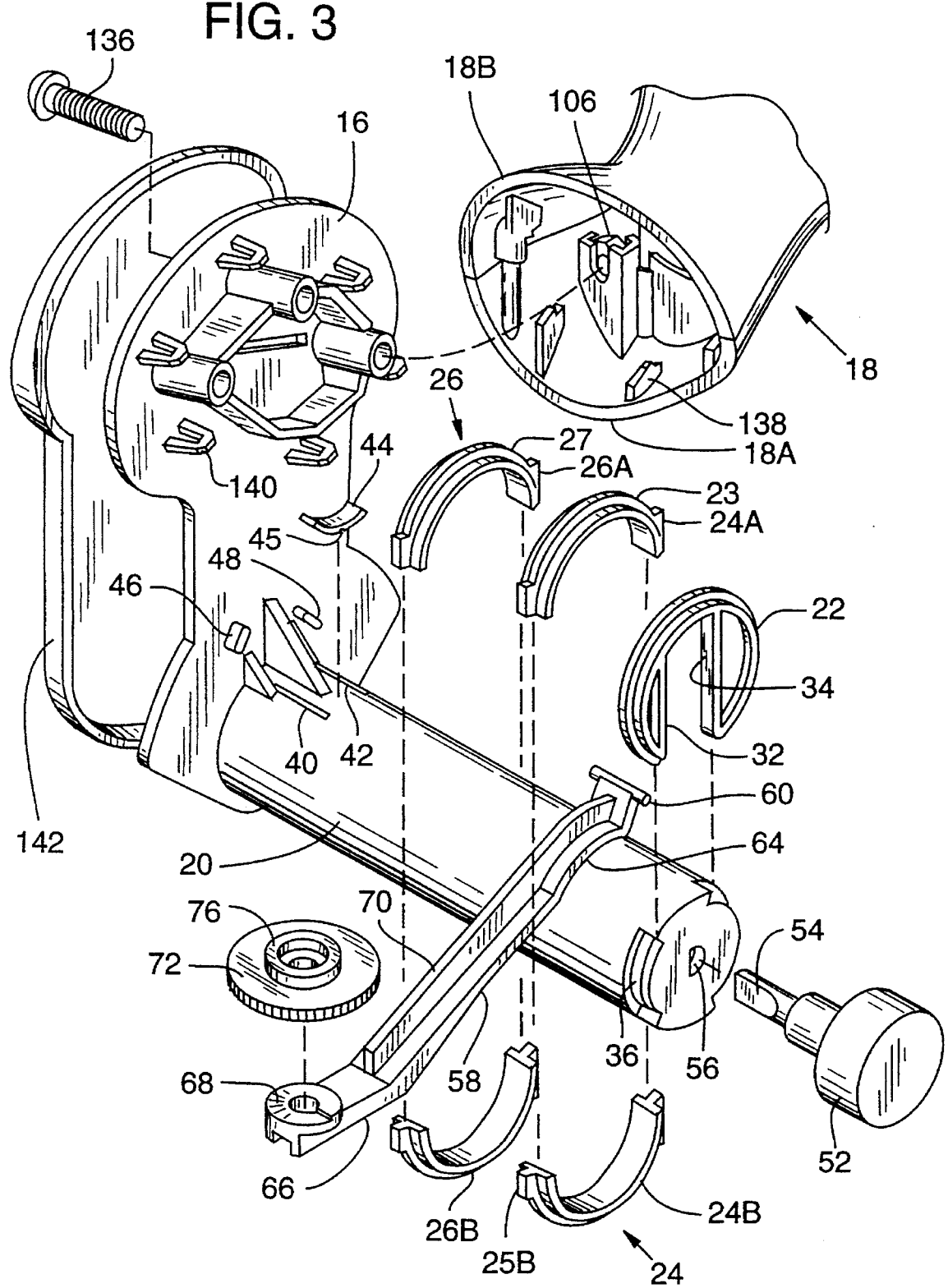
FIG. 3 is an exploded, perspective view of the shaft, handle and braking mechanism of the side-mounted throttle controller of FIG. 1.

Referring now to FIG. 1, a side-mounted throttle controller according to the invention is shown generally at 10. The controller includes a base 12 adapted to support the controller on a horizontal surface and a handle 14 pivotally mounted on the base. The base is preferably rectangular and formed in upper and lower portions 12A, 12B (see FIG. 5). The handle includes a radial member or arm 16 mounted on one side of the base and extending perpendicular thereto and a handle portion 18 connected to the member arm 16 and extending horizontally over the base 12. The handle portion is adapted to be grasped in a user's hand. In the preferred embodiment, the handle portion is adapted to receive a user's left hand. Alternatively, the handle portion 18 could be transposed to receive a user's right hand. However, conventionally the user's right hand is used to grasp the joystick, which is used in conjunction with the throttle controller.

The handle 14 is pivotally mounted on the base by means of a horizontal shaft 20 journaled in the base. The radial member 16 is connected to a first end of the shaft so that the shaft rotates responsive to angular movement of the handle. In the preferred embodiment, the radial arm 16 and the shaft 20 are comprised of a single injection molded piece; alternatively, the two could be formed separately and connected together by screws or similar attachment means.

The shaft 20 is mounted in the base 12 as shown in FIGS. 3 and 4. The shaft is journaled in the base by means of three bearings or bushings 22, 24 and 26. Each of the bearings includes an annular flange or ridge 23 extending along the outer circumference of the bearing. The ridge is received in a corresponding bearing mount formed by two opposing sidewalls or webs such as sidewalls 28A and 28B in FIG. 4, which receives the ridge of bearing portion 24A. These sidewalls 28A and 28B can either be formed continuously around the shaft or, alternatively, two sets of sidewalls can be used on opposing sides of the shaft such as sets 28A, 28B and 30A, 30B, as shown further in FIG. 7. Bearing 26 is similarly mounted between a third sidewall 29A and a fourth sidewall 29B, as shown in FIG. 4.

The bearings 24 and 26 are each formed of two semicircular piece: bearing 24 comprised of piece 24A, 24B and bearing 26 comprised of piece 26A, 26B in FIGS. 3 and 4. When the two respective pieces are joined. together there is a rectangular portion of the ridge formed on each side of the bearing (e.g., 25A and 25B in FIG. 3). These rectangular portions are received in notches formed between the two sets of sidewalls (e.g., 28B and 30B in FIG. 7) in order to keep the bearing from rotating responsive to movement of the shaft. These notches can most easily be seen in FIG. 7. Bearing 26 is similarly constructed and mounted and is therefore not further described.

The bearing 22 is constructed differently from bearings 24 and 26 because bearing 22 also serves the dual purpose of retaining the shaft 20 in the base 12. Bearing 22 is formed in one piece and does not have rectangular portions protruding from the annular flange. Instead, it includes two parallel legs 32 and 34 that are received in notches, such as notch 36, formed at a second end of the shaft 20. When the legs are received in the notches, the bearing 22 rotates with the shaft when the shaft is rotated. The sidewalls 38A and 38B, which form the bearing mount for bearing 22 prevent the shaft from moving horizontally, thereby retaining the shaft 20 in the base 12.

The throttle controller 10 also includes the ability to set the handle in two predetermined conditions. These predetermined conditions can correspond to desired settings such as for idle or afterburners. These positions are know as detents. The shaft 20 includes two horizontal ridges 40 and 42, shown in FIG. 3 and FIG. 5. An arcuate spring 44 having a slot 45 bisecting its length for receiving the ridges 40 and 42 is mounted on the upper wall of the base so that the slot 45 can receive the ridges. One of the ridges engages the slot when the handle 14 is pivotally moved to either of the predetermined positions. The spring 44 is supported in a bowed condition in a pocket in the upper wall of the base. The ridge is retained in the slot until sufficient pressure is applied to the handle to release the ridge from the slot, overcoming biasing force of the bowed spring.

The range of motion of the handle is limited by two stops 46 and 48 mounted on the radial member 16 at 45 degree offsets from vertical. These stops 46 and 48 limit the angular travel of the handle to a 90 degree quadrant by abutting against an interior wall of the base 12 when the handle is moved to the maximum and minimum positions, respectively. The operation of the stops can clearly be seen in FIG. 5 where the radial member 16 is shown in broken line with the stop 46 abutting an interior wall 50 when the handle is in the minimum position.

Referring back to FIGS. 3 and 4, the throttle controller 10 includes a potentiometer 52 mounted inside the base for sensing the position of the handle. The potentiometer 52 includes a stem 54 that is received in a semicircular bore 56 at a second end of the shaft 20. The potentiometer 52 is fixedly mounted on the base 12 so that only the stem rotates responsive to movement of the shaft. An electrical conductor (not shown) is used to transmit the potentiometer setting to a printed circuit board, described hereinafter. The potentiometer setting is then transmitted to a personal computer or other video game platform (not shown) via a cable 166 shown in FIG. 1.

Figure 6:
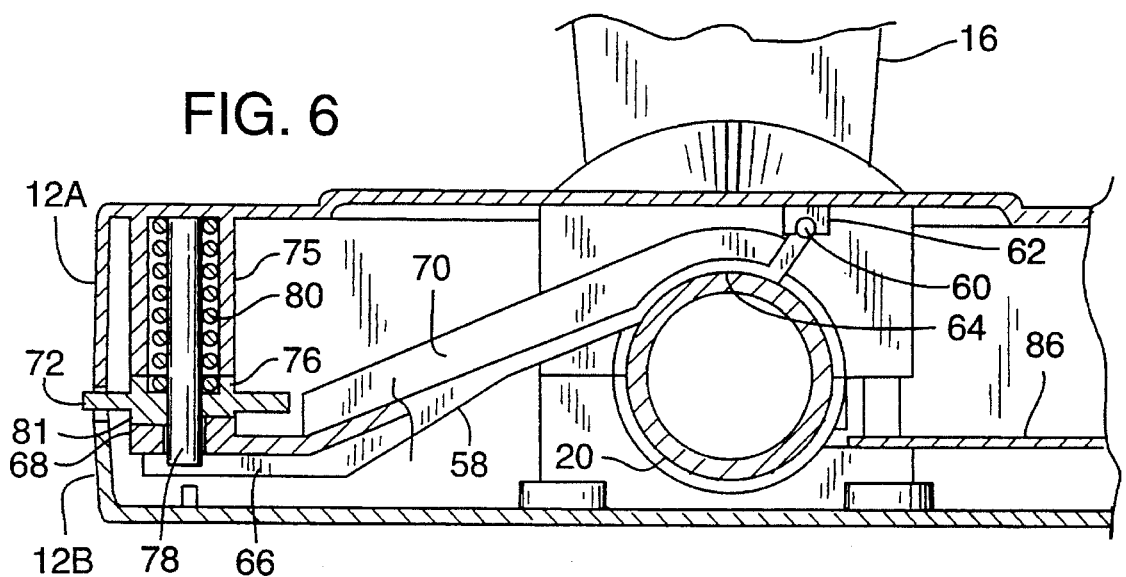
FIG. 6 is a cross sectional view of the throttle controller taken along lines 6—6 in FIG. 4.

The side-mounted throttle controller 10, according to the invention, also includes a braking mechanism for adjusting the resistance of the handle to angular movement by the user. The braking mechanism includes a braking arm 58 pivotally mounted on the base 12 as shown in FIGS. 3 and 6. The braking arm 58 includes a pivot pin 60 received in a mount 62 in the top portion 12A of the base, as shown in FIG. 6. The braking arm includes an arcuate portion 64 which frictionally engages the cylindrical surface of shaft 20. The braking arm extends tangentially away from the arcuate portion to a second end 66 having a helical thread 68 formed around a hole at the end of arm 58. The braking arm 58 further includes a vertical ridge 70 extending therealong, which strengthens the braking arm.

The braking mechanism also includes a rotatable knob 72 rotatably engaged and aligned with the helical thread 68 of the braking arm 58. The knob is mounted between the helical thread 68 and an interior cylindrical wall or receptacle 75 extending downwardly from the top portion 12A of the base. The cylindrical wall 75 abuts against a concentric cylindrical portion 76 of the knob 72. A pin 78 received within receptacle 75 extends vertically from the top portion of the base 12A to the second end 66 of the braking arm through knob 72 to act as a pivot point about which the knob 72 rotates. Surrounding the pin 78 is an optional spring 80 to provide some downward biasing force. On a bottom side of the knob 72 (not visible in FIG. 3 but shown in FIG. 7) is a helical thread portion 81 engaged with the helical thread 68 of the braking arm. The helical thread 81 engages the helical thread 68 of the braking arm as the knob is rotated thereby acting as an axial cam. The threads are said to be complementary in that the entire surfaces can be brought together for minimal downward displacement of the end 66 of arm 58. As the helical portion 81 of the knob 72 moves long the helical portion 68 of the braking arm, a downward pressure is applied to the braking arm 58 thereby causing the arcuate portion 64 to increase the friction applied to the shaft 20.

The amount of adjustment provided by the knob 72 is determined by the height of the thread 68 and therefore the helical portion 81. The knob 72 can make one full rotation worth of adjustment. After one complete rotation of applying increasingly more downward pressure, the helical portion 81 will snap back to the lowest position. It should be noted that the knob 72 remains in substantially the same vertical position throughout the full range of rotational movement thereof and only the braking arm 58 moves responsive thereto.

Figure 5:
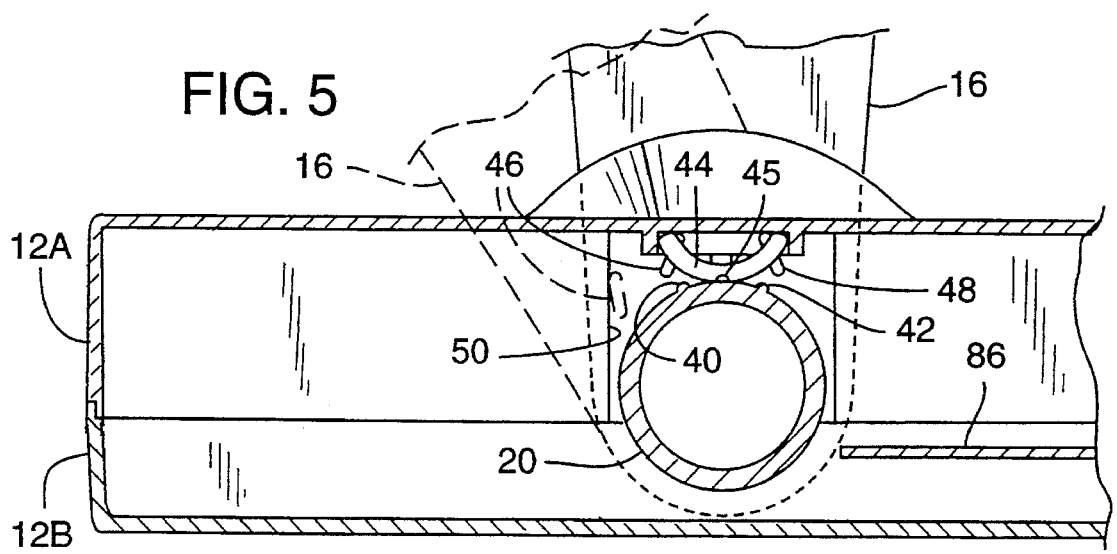
FIG. 5 is a cross sectional view of the throttle controller taken along lines 5—5 in FIG. 4.
Figure 7:
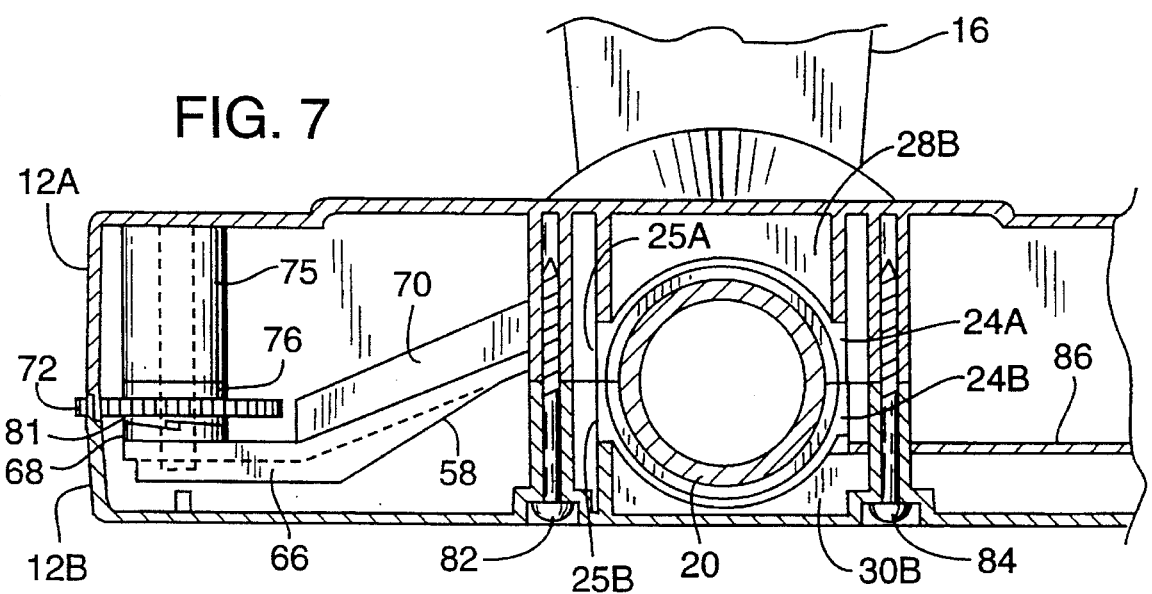
FIG. 7 is a cross sectional view of the throttle controller taken along lines 7—7 in FIG. 4.
Figure 10:
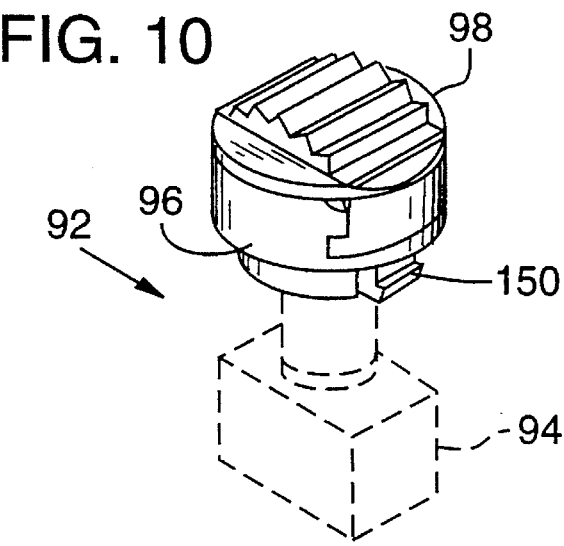
FIG. 10 is a perspective view of a slide switch mechanism of the throttle controller of FIG. 1 employing a toggle switch shown in dashed lines.
Figure 11:
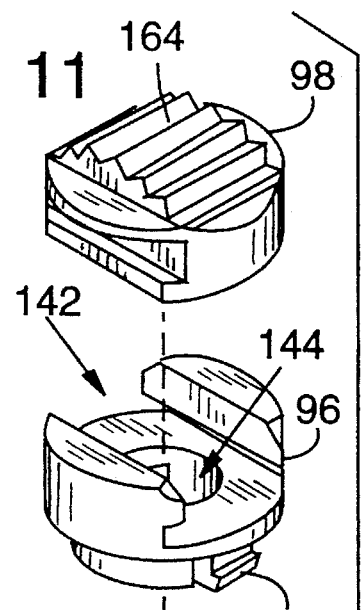
FIG. 11 is an exploded view of the switch mechanism of FIG. 10.
Figure 12:
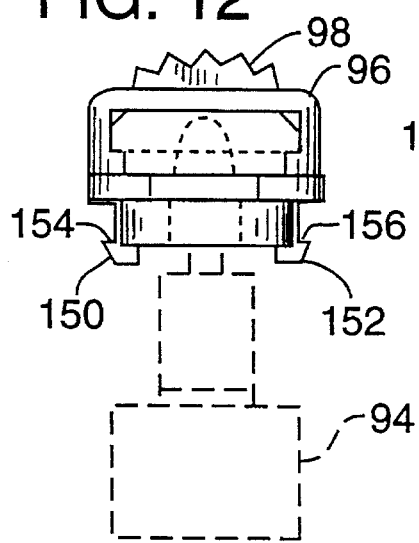
FIG. 12 is a side elevational view of the switch mechanism of FIG. 10.
Figure 13:
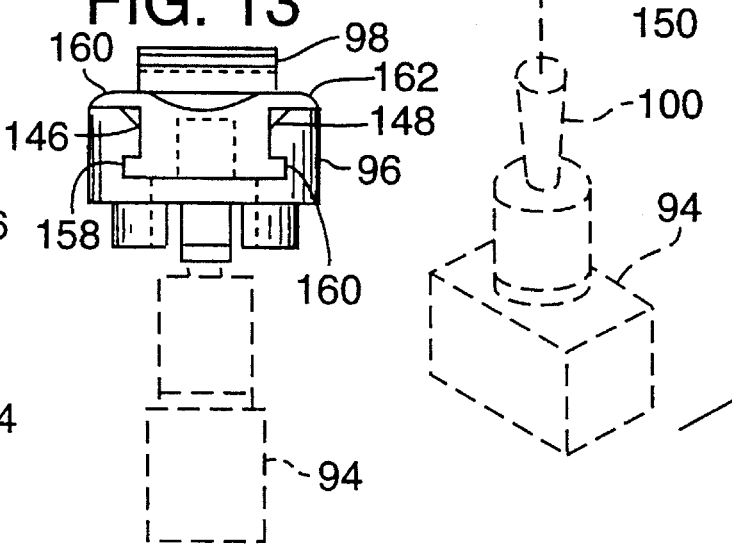
FIG. 13 is a rear elevational view of the switch mechanism of FIG. 10.

As shown in FIGS. 5 and 7, the base 12 is comprised of two separate pieces: the top piece 12A and the bottom piece 12B. These two pieces are joined together by means of screws such as screws 82 and 84. The pieces forming base 12, in the preferred embodiment, are made of injection molded plastic so that the screws self-thread into the plastic cylindrical receptacles formed by the top and bottom base pieces.

Mounted on the base is a printed circuit board 86, a part of which is shown in FIGS. 5–7. Mounted on the printed circuit board are a plurality of electrical and electronic components that perform the electrical functions of the throttle controller. In the preferred embodiment of the throttle controller, the electronics include a reconfiguration ability which allows each of the input devices to be reconfigured pursuant to the user's specification. The electronics and method of operation necessary to implement this reconfiguration feature are described in commonly assigned copending application Ser. No. 08/177,625 filed Jan. 5, 1994, RECONFIGURABLE JOYSTICK CONTROLLER WITH MULTI-STAGE TRIGGER AND RECALIBRATION incorporated herein by reference. Because the focus of the invention is on the mechanical structure and operation of the controller, a discussion of the electronics is omitted.

Referring to FIGS. 8 and 9, the handle portion 18 comprises two separate pieces: a bottom piece 18A and a top piece 18B. These pieces are formed of injection molded plastic in order to snap together to form the contiguous handle portion 18.

The top piece 18B is shown in FIG. 8 and the switch mechanisms mounted therein are shown in greater detail in FIGS. 10–16. The top piece 18B includes two openings 88 and 90 for receiving respective switch mechanisms. Each switch mechanism includes three individual components. For example, the switch mechanism shown generally at 92 includes a toggle switch 94, a switch holder 96 and a switch actuator 98. The toggle switch 94 is received in a slot formed by two interior sidewalls or webs and a rear wall opposite the opening 88. When the switch 94 is received in the slot, the switch stem 100 extends through the opening 88 to protrude from the top piece 18B of the handle portion. The switch holder 96 then snaps into the opening 88 over the stem 100. The switch holder 96 includes a central opening into which the stem 100 is inserted. The switch holder 96 is retained in the opening 88 by means of two legs 150, 152, described further below. The switch actuator 98 is slidably mounted in a channel formed on a top side of the switch holder 96. The actuator 98 also includes an opening 102 in which the stem 100 is inserted and retained. A more complete description of the switch mechanism 92 is included herein below with reference to FIGS. 10–16.

The top piece 18B also includes slots for receiving nuts that are used to connect the handle portion 18 to the vertical member 16, as shown in FIG. 3. For example, a slot 104 adapted to receive a nut 106 is formed on the top piece 18B. The web forming slot 104 is open on both sides to allow a screw to be threaded into the nut 106 when the handle is attached to the vertical member 16 by means of the screw.

The top piece 18B, as well as the bottom piece 18A, includes a plurality of cylindrical receptacles for receiving a corresponding guidepost that allow the two pieces 18A and 18B to be fitted together. For example, bottom piece 18A includes a guidepost 110 that is received in a cylindrical receptacle 108 when the two pieces are joined together. Similarly, the top piece 18B includes guideposts such as guidepost 112 that are received in corresponding cylindrical receptacles on the bottom piece 18A such as channel 114. These may be freely varied as suits the designer.

Referring now to FIG. 9, the bottom piece 18A of the handle portion is shown in an exploded view. The bottom piece 18A is generally similar to the top piece and complementary thereto except that the bottom piece includes a plurality of user-actuatable input devices not found on the top piece. A detent potentiometer 118 is mounted on the lower piece 18A so that the stem 119 of the potentiometer is received in an opening formed in a sidewall of the piece. A cap (not shown) is the fitted over the stem 119 to allow the user manually to actuate the potentiometer 118. A flange 123 helps retain the potentiometer in the handle, along with a series of interior walls that create a slot for receiving the potentiometer.

The bottom piece 18A includes two compound digital and analog input devices. The first such device includes potentiometer 116 and switch 124. The potentiometer 116 is mounted on the bottom piece so that its rotatable stem 117 protrudes from the bottom piece 18A through an opening formed in a sidewall thereof. A cap 128 is then fitted over the stem to allow the user to rotate the stem and thereby actuate the potentiometer.

The potentiometer 116 also functions as an actuator arm for a corresponding push button switch 124 juxtaposed to the potentiometer 116. Thus, when both the potentiometer and corresponding push button switch are mounted on the handle portion, the user can depress the cap thereby actuating the corresponding push button switch. The potentiometer includes a flange 121 that limits the travel of the potentiometer.

The bottom piece also has mounted thereon a trackball mechanism 122. The trackball mechanism is a conventional trackball mechanism in that it includes two quadrature encoders that encode the movement of the trackball. These encoders encode the movement of the trackball in its two quadrature signals from which the relative movement of the trackball can be determined. The trackball mechanism 122 is mounted on the handle portion to be easily accessible by the user's thumb when grasped by the user's hand. The trackball mechanism also has associated therewith a discrete switch 126 that is mounted on the lower piece 18A and juxtaposed to the rear end of the trackball 122. The trackball 122 has a certain degree of freedom to move within the handle so that a user can actuate the switch 126 by depressing the trackball. In this way, the trackball provides for both an analog trackball and a discrete switch.

Finally, the lower piece 18A of the handle portion includes a large 4-way switch 120 received in an opening 130 formed on the bottom piece 18A. The opening 130 includes at least one notch such as notch 132 to receive a corresponding shoulder such as shoulder 134 on the switch 120. To mount the switch 120 on the bottom piece 18A the shoulder is aligned with the notch and the button is then inserted into the opening. To retain the switch in the opening, the switch 120 is then rotated so that the shoulder 134 abuts against the interior of the sidewall of the bottom piece 18A.

Once the input devices are properly mounted on their respective pieces of the handle portion, the two pieces 18A and 18B are fitted together so that the guideposts are engaged with the corresponding cylindrical channels. The friction between the guideposts and the cylindrical receptacles is sufficient to hold the handle portion together. Once the handle portion is assembled in the above-described manner, the handle portion is attached to radial member 16 as shown in FIG. 3. The handle portion 18 is attached to the radial member 16 by means of screws such as screw 136 (FIG. 3) that are screwed into the corresponding nuts 106 held in the handle portion. The radial member 16 also includes a plurality of arches which receive corresponding notches formed on the handle portion. For example, notch 138 is received in arch 140. After the screws are tightened down, a cover 142 is snapped over the outer side of radial member 16 to cover the heads of the screws.

Referring now to FIGS. 10–13, the method of construction the switch mechanism 92 is shown. The switch mechanism 92 effectively emulates an expensive slide switch using an inexpensive toggle switch 94. The toggle switch 94 is a multi-position switch so that the switch mechanism 92 has multiple discrete settings.

The switch holder 96 has a central channel 142 formed on a top side thereof for receiving the slide actuator 98. The switch holder 96 also includes a central opening 144 extending from the top side through the bottom side to allow the switch stem 100 to be inserted therein. The opening 144 must be large enough to allow the stem 100 to move through its full angular range of motion when inserted therein. The switch holder has two shoulders 146 and 148 (FIG. 13) extending along respective sides of the channel to retain the switch actuator 98 in the channel 142. The switch holder 96 is retained in an opening by means of two parallel legs 150 and 152. Each leg has a lip (154 and 156) at a distal end thereof for retaining the switch holder 96 in an opening such as opening 88 in FIG. 8.

The switch actuator 98 is slidably mounted on the switch holder channel 142. The actuator includes a first foot or flange 158 slidably engaged in the channel beneath the switch holder shoulder 146 and a second foot or flange 160 slidably engaged in the channel beneath the shoulder 148. This foot and shoulder combination, along with the switch stem 100, forms a guideway which retains the actuator 98 slidably in the channel. The actuator further includes two shoulders 160 and 162 extending over the shoulders 146 and 148 of the switch holder, respectively, when the actuator is slidably mounted on the channel. In the preferred embodiment, the actuator 98 includes a plurality of raised ridges along a top side of the switch actuator. These ridges allow for easy manipulation of the actuator 98. The switch actuator also has a central opening formed in a bottom side thereof to receive the switch stem 100. This allows the switch actuator to move the stem as the actuator is slid along the channel.

Figure 14:
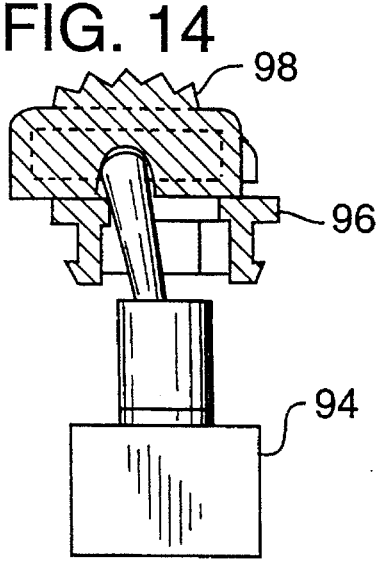
FIG. 14 is a cross sectional view of the switch mechanism of FIG. 10 showing the switch mechanism in a first position.
Figure 15:
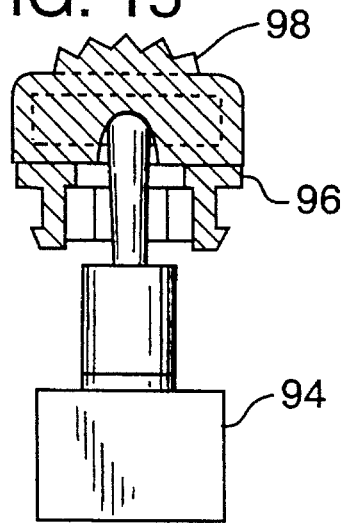
FIG. 15 is a cross sectional view of the switch mechanism of FIG. 10 showing the switch in a second position.
Figure 16:
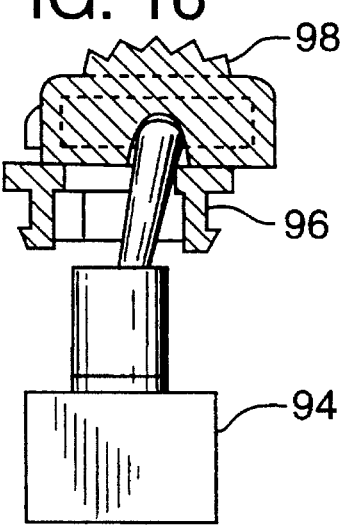
FIG. 16 is a cross sectional view of the switch mechanism of FIG. 10 showing the switch in a third position.

Referring now to FIGS. 14–16, a method of using the switch mechanism is shown. In FIG. 14, the switch mechanism is in a first position with the switch actuator slid to its leftmost position. In FIG. 15, the switch actuator is moved to the right with respect to FIG. 14 to place the switch at a second position. Finally, in FIG. 16, the actuator is moved to its rightmost position thereby placing the switch in a third position. Thus, the switch mechanism 92 effectively emulates an expensive multi-position slide switch using only a multi-position toggle switch. This technique can be extended to a multiplicity of different positions depending on the number of positions of the toggle switch.

Referring again to FIG. 1, the throttle controller 10 includes a cable 166 for connecting the throttle controller to a video game platform. The cable includes a connector 168 that performs the physical connection. In the preferred embodiment, this connector is compatible with a keyboard connector as used on a personal computer. Alternatively, the connector can be a game card connector as provided by video game cards such as described in U.S. Pat. No. 5,245, 320 issued to Bouton. Although the throttle controller is preferably used in combination with personal computer video games, it is not limited thereto. The invention described herein can be used in conjunction with a variety of video game platforms such as Nintendo, Sega, 3DO, etc.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A video game controller for a video game comprising:
   a base;
   a longitudinal shaft mounted on the base for rotational movement about a longitudinal axis of the shaft;
   a handle fixedly connected to the shaft, the shaft rotatable about the longitudinal axis responsive to pivotal movement of the handle about the longitudinal axis;
   a first sidewall mounted on the base;
   a second sidewall mounted on the base and parallel to the first sidewall and spaced therefrom to form a slot between the first and second sidewalls;
   an annular ridge mounted on the shaft and received in the slot formed between the first and second sidewalls;
   a potentiometer having a rotatable stem operatively coupled to the shaft so that the stem rotates responsive to rotation of the shaft, the potentiometer generating an electrical signal that is proportional to the rotational position of the stem; and
   a cable coupled to the potentiometer for providing the electrical signal to the video game.

2. A video game controller for a video game according to claim 1 wherein the annular ridge mounted on the shaft and received in the slot formed between the first and second sidewalls includes a first rectangular portion at a first position along the annular ridge and a second rectangular portion at a second position along the annular ridge.

3. A video game controller for a video game according to claim 1 wherein the annular ridge mounted on the shaft and received in the slot formed between the first and second sidewalls includes:
   a first semicircular ridge; and
   a second semicircular ridge, wherein said first and second semicircular ridges circumscribe the shaft when placed together.

4. A video game controller for a video game according to claim 1 further comprising:
   a third sidewall mounted on the base;
   a fourth sidewall mounted on the base and parallel to the third sidewall and spaced therefrom to form a second slot between the third and fourth sidewalls; and
   a second annular ridge mounted on the shaft and received in the second slot formed between the third and fourth sidewalls.

5. A video game controller for a video game comprising:
   a base;
   a longitudinal shaft mounted on the base for rotational movement about a longitudinal axis of the shaft;
   a handle fixedly connected to the shaft, the shaft rotatable about the longitudinal axis responsive to pivotal movement of the handle about the longitudinal axis;
   a detent mechanism including a protrusion mounted on the shaft and
   an arcuate spring having a slot formed therein, the spring mounted on the base opposing the shaft so that the slot is aligned with the protrusion so that the protrusion engages the slot when the handle is pivotally moved to a first predetermined position;
   a potentiometer having a rotatable stem operatively coupled to the shaft so that the stem rotates responsive to rotation of the shaft, the potentiometer generating an electrical signal that is proportional to the rotational position of the stem; and
   a cable coupled to the potentiometer for providing the electrical signal to the video game.

6. A video game controller for a video game according to claim 5 further including a braking mechanism frictionally engaging the shaft, the braking mechanism including a rotatable knob for adjusting the amount of friction exerted on the shaft.

7. A video game controller for a video game comprising:
   a base;
   a longitudinal shaft mounted on the base for rotational movement about a longitudinal axis of the shaft;
   a handle fixedly connected to the shaft, the shaft rotatable about the longitudinal axis responsive to pivotal movement of the handle about the longitudinal axis;
   a braking arm pivotally mounted on the base and having an arcuate portion frictionally engaged with the shaft; and
   an adjustment mechanism coupled between the base and the braking arm for adjusting a frictional force applied by the braking arm to the shaft;
   means mounted in the base and coupled to the shaft for sensing a position of the handle; and
   means for transmitting a the sensed position to the video game machine.

8. A video game controller for a video game according to claim 7 wherein the means for transmitting the sensed position to the video game includes a cable coupled to the sensing means.

9. A video game controller for a video game according to claim 7 wherein the means for sensing the position of the handle includes a potentiometer mounted on the base and having a stem connected coaxially to the shaft so that the stem rotates responsive to movement of the shaft.

10. A braking mechanism for a video game controller having a pivoting handle connected to a rotatable shaft mounted on a base, the braking mechanism comprising:
    a braking arm having an arcuate portion at a first end of the arm frictionally engageable with the shaft, the arm terminating at a second end, opposite the first end; and
    an adjustment mechanism mounted between the base and the second end of the braking arm to apply a force on the second end for adjusting a frictional force applied by the arcuate portion of the braking arm to the shaft.

11. A braking mechanism for a video game controller according to claim 10 wherein the braking arm includes a pin at the first end for pivotally mounting the braking arm in the base.

12. A braking mechanism for a video game controller according to claim 10 wherein the braking arm includes a pin at a distal end of the arcuate portion opposite the second end, the stem receivable in a slot in the base of the video game controller to allow the arm to pivot about the pin.

13. A braking mechanism for a video game controller according to claim 10 wherein the adjustment mechanism includes a rotatable knob mounted between the base and the second end of the braking arm to adjust the force applied to the second end of the arm.

14. A braking mechanism for a video game controller according to claim 13 wherein the rotatable knob includes a helical thread for applying pressure to the second end of the braking arm responsive to rotation of the knob.

15. A braking mechanism for a video game controller according to claim 14 wherein the second end of the braking arm includes a helical thread complementary to the helical thread of the rotatable knob.

16. A braking mechanism for a video game controller according to claim 13 wherein the adjustment mechanism further includes:

a pivot coupling the first end of the braking arm to the base; and a spring for biasing the rotatable knob into engagement with the second end of the braking arm.

17. A braking mechanism for a video game controller according to claim 13 wherein the second end of the braking arm includes a helical thread in contact with the rotatable knob.

18. A braking mechanism for a video game controller according to claim 17 wherein the rotatable knob includes a helical thread at a distal end thereof, the helical thread of the knob mounted on the helical thread of the braking arm so that the helical thread of the knob slides over the helical thread of the braking arm as the knob is rotated.

* * * * *